Feb. 17, 1970 — H. A. RASS — 3,495,479
AUTOMATIC POWER TRANSMISSION
Filed April 19, 1968 — 3 Sheets-Sheet 1

INVENTOR.
HANS A. RASS,
BY
ATTORNEYS.

INVENTOR.
HANS A. RASS,
BY
Berman, Davidson & Berman
ATTORNEYS.

Feb. 17, 1970     H. A. RASS     3,495,479
AUTOMATIC POWER TRANSMISSION
Filed April 19, 1968     3 Sheets-Sheet 3

INVENTOR.
HANS A. RASS,
BY
ATTORNEYS.

United States Patent Office 3,495,479
Patented Feb. 17, 1970

3,495,479
AUTOMATIC POWER TRANSMISSION
Hans Anton Rass, 303 St. Lawrence,
Beloit, Wis. 53511
Filed Apr. 19, 1968, Ser. No. 722,793
Int. Cl. F16h 3/74
U.S. Cl. 74—751    9 Claims

ABSTRACT OF THE DISCLOSURE

A power transmission assembly consisting of a housing having coaxial input and output shafts journaled in opposite end walls of the housing. The shafts are journaled in supports fixed to a vehicle or other body employing the assembly, so that the housing is rotatable. The input and output shafts have opposing bevel gears in the housing coupled by pinion gears on diametrically opposite pinion shafts journaled in the housing. Respective hemispherical annular flywheels surround and are gearingly-coupled to the pinion shafts. The flywheels generate opposing precessional torques acting on the housing, allowing useful torque to be transmitted to the output shaft at a speed reduction in accordance with the load on the output shaft.

---

This invention relates to improvements in power transmissions, and more particularly to an automatic power-transmission assembly of the type employing gyroscopic or precessional coupling.

A main object of the invention is to provide a novel and improved variable-speed power-transmission assembly which is relatively simple in construction, which involves a minimum number of parts, which is self-adjusting in action, and which eliminates the necessity of employing any mechanically-operated gear-shifting mechanism, or other external speed-changing devices, as well as eliminating the necessity of employing a clutch in the transmission system.

A further object of the invention is to provide an improved power-transmission mechanism which operates by employing gyroscopic or precessional coupling, wherein the gyroscopic parts move substantially independently of the input and output shafts of the assembly, which provides a flexible action minimizing vibration or shock, which provides a wide range of torque transmission, which provides a maximum balance of the rotating parts thereof, which is useful with many different motor designs, and which is reversible.

A still further object of the invention is to provide an improved power-transmission assembly for transmitting torque from a driving shaft to an output shaft at a speed reduction in accordance with the load on the output shaft, the assembly being relatively inexpensive to manufacture, being compact in size, being easy to maintain in efficient working order, and being smooth in operation.

A still further object of the invention is to provide an improved power-transmission assembly of the type utilizing gyroscopic or precessional coupling, the assembly being particularly adapted to be employed with a motor vehicle or other type of vehicle or machine, the mechanism providing smooth and efficient transmission of torque from the prime mover associated therewith to the load to be driven, the mechanism being provided with internal lubricating means to minimize wear on its moving parts, and the mechanism operating to automatically provide a speed reduction between its input shaft and its output shaft in accordance with changes in loading on the output shaft.

Further objects and advantages of the invention will become apparent from the following description and claims, and from the accompanying drawings, wherein:

Figure 1:
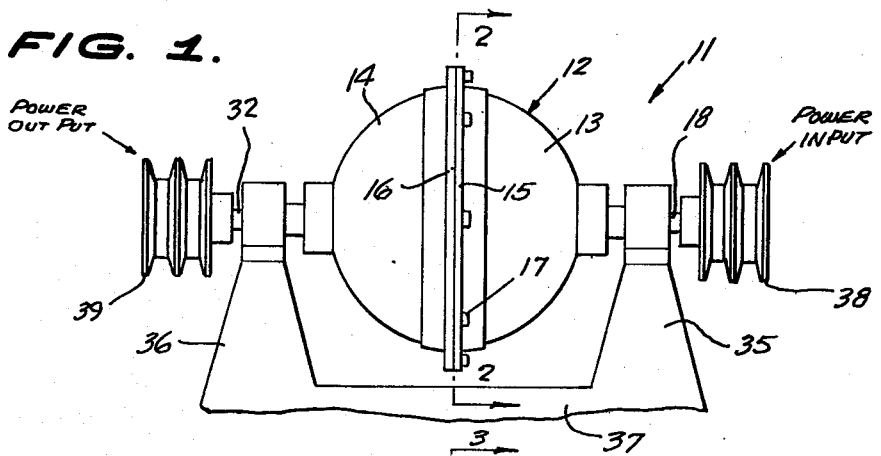
FIGURE 1 is an elevational view showing an improved power-transmission assembly constructed in accordance with the present invention.

Referring to the drawings, 11 generally designates an improved power-transmission assembly constructed in accordance with the present invention. The assembly 11 comprises a generally spherical housing, designated generally at 12 having respective opposing and mating generally hemispherical housing segments 13 and 14. The segments 13 and 14 are provided with peripheral rim flanges, shown respectively at 15 and 16 which are sealingly-fastened together by a plurality of fastening bolts 17.

Figure 3:
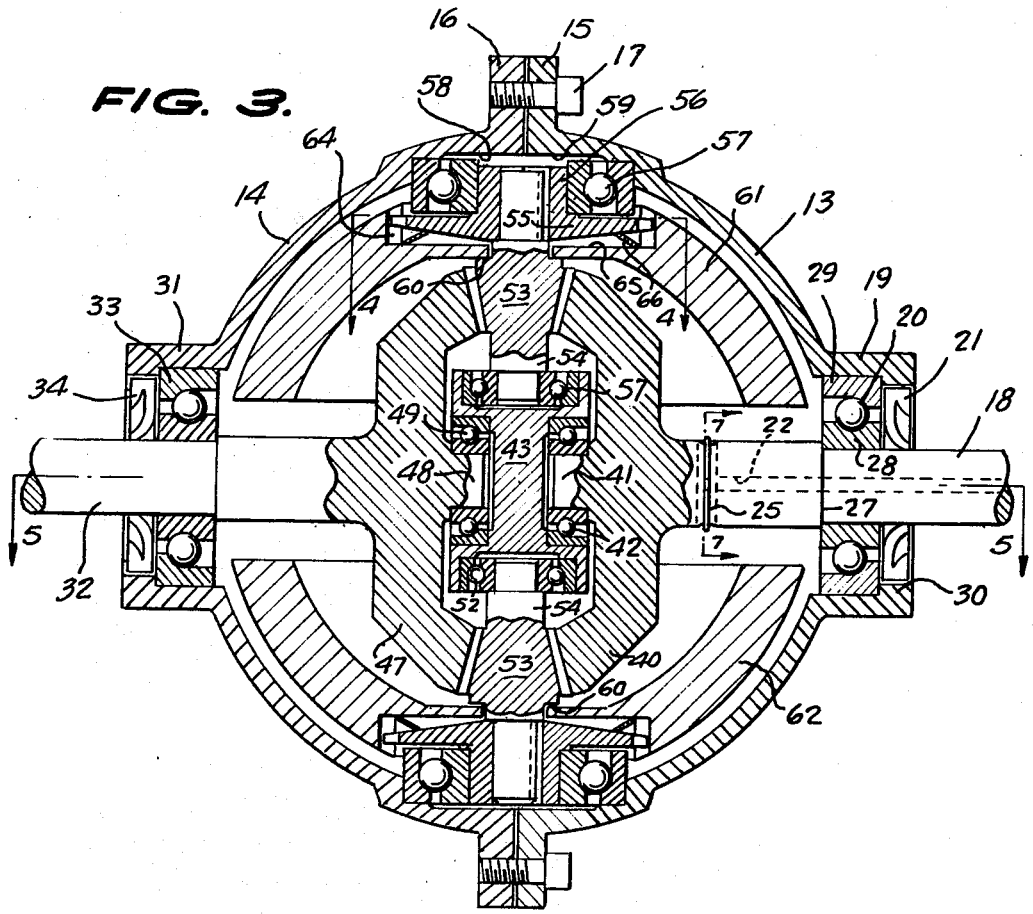
FIGURE 3 is a transverse vertical cross-sectional view taken substantially on the line 3—3 of FIGURE 2.
Figure 4:
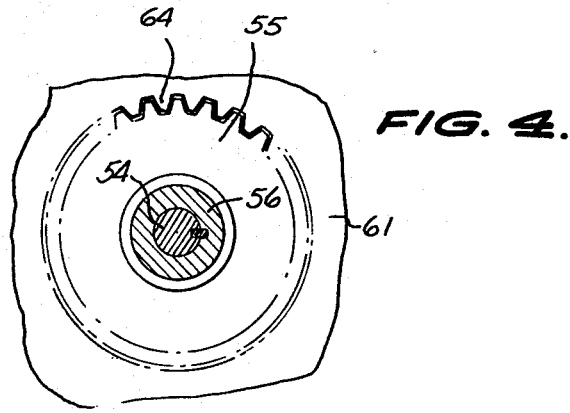
FIGURE 4 is a fragmentary horizontal cross-sectional view taken substantially on the line 4—4 of FIGURE 3.
Figure 7:
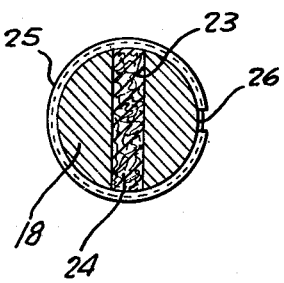
FIGURE 7 is an enlarged vertical cross-sectional view taken substantially on the line 7—7 of FIGURE 3.

A power input shaft 18 is centrally journaled in a bearing sleeve portion 19 provided on housing segment 13, being rotatably-mounted in a ball bearing assembly 20 seated in sleeve portion 19, as clearly shown in FIGURE 3. A suitable sealing gland assembly 21 is provided in the outer portion of bearing sleeve 19, providing a rotating seal with respect to power input shaft 18.

As will be presently explained, the interior of housing 12 contains a quantity of lubricant such as lubricating oil, and the lubricant is admitted through an axial bore provided in the input shaft 18, said bore being shown at 22. Bore 22 communicates with a transverse bore 23 provided in the inner portion of shaft 18, said transverse bore containing a porous plug element 24, acting as a filter. Plug element 24 is retained in transverse bore 23 by a snap ring 25 contained in an annular groove 26 provided on shaft 18 at the location of transverse bore 23. As shown in FIGURE 3, the shaft 18 is reduced to define a shoulder 27 adjacent the ball bearing assembly 20 so that the inner race 28 of the ball bearing assembly bears against the shoulder 27. The outer race 29 of the ball bearing assembly bears against an inwardly-directed annular flange portion 30 provided at the rim of the bearing sleeve 19, with the rotating retaining sealing gland assembly 21 secured within flange 30.

The other hemispherical segment 14 of housing 12 is similarly provided with a bearing sleeve 31 in which the output shaft of the assembly, shown at 32, is centrally journaled, being provided with a ball bearing assembly 33 and a sealing gland assembly 34 similar to the ball bearing assembly 20 and sealing gland 21 previously mentioned in connection with the power input shaft 18.

Power input shaft 18 and power output shaft 32 are in axial alignment and may be suitably journaled on the vehicle or other body employing the power-transmission assembly, for example, by the provision of respective bearing supports 35 and 36 rising from the frame 37 of the vehicle, or other body employing the power-transmission assembly. As will be apparent from FIGURE 1, this permits the housing 12 to rotate freely between the shaft bearing supports 35 and 36.

The power input shaft may be provided with a suitable drive pulley 38 for coupling shaft 18 to a suitable prime mover. Similarly, the power output shaft 32 may be provided with a suitable pulley assembly 39 for coupling output shaft 32 to its load. As will be understood, suitable belts are employed with the power input pulley assembly 38 and the power output assembly 39.

Figure 6:
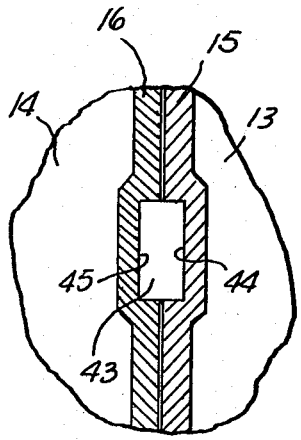
FIGURE 6 is a fragmentary horizontal cross-sectional view taken substantially on the line 6—6 of FIGURE 5.

Rigidly-secured to the inner end of power input shaft 18, for example, by being formed integral therewith, is a relatively large bevel gear 40. The inner end of the power input shaft, shown at 41, is rotatably-supported in a ball bearing assembly 42 mounted in a transverse supporting bar 43 rigidly-secured diametrically in the housing 12. Thus, as shown in FIGURE 6, the flanges 15 and 16 are formed with respective diametrically-opposed pairs of mating opposing recesses 44, 45 defining rectangular sockets receiving the rectangular opposite end portions of the transverse crossbar 43. The opposite ends of crossbar 43 are clampingly-secured in the pairs of recesses 44, 45 by respective clamping screws 46, 46 engaged through flange 15 and threadedly-engaged in flange 16 outwardly-adjacent the respective opposite ends of crossbar 43 so that when the screws 46, 46 are tightened the opposite ends of crossbar 43 are rigidly-clamped between the housing segments 13 and 14.

As shown in FIGURE 3, the bevel gear 40 in inwardly-concave. A similar, substantially identical bevel gear 47 is integrally-formed on the inner end of the power output shaft 32, the bevel gear 47 being also inwardly-concave and opposing the drive bevel gear 40. The inner end of the output shaft 32, shown at 48, is journaled in a ball bearing assembly 49 mounted in the center portion of crossbar 43 directly opposite the previously-mentioned ball bearing assembly 42, as is clearly shown in FIGURE 3.

Figure 5:
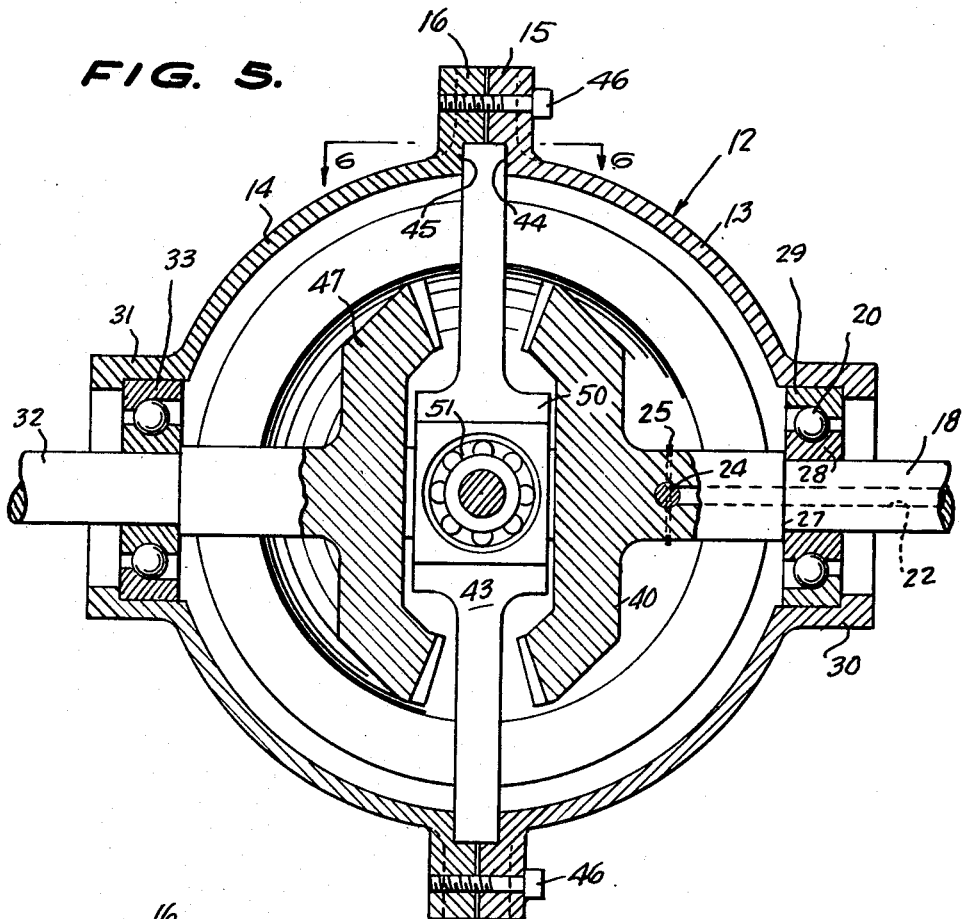
FIGURE 5 is a horizontal cross-sectional view taken substantially on the line 5—5 of FIGURE 3.

As shown in FIGURE 5, the central portion of the crossbar 43 comprises a block 50, the opposite sides of the block being formed with suitable sockets receiving the various ball bearing assemblies, such as the ball bearing assemblies 42 and 49, and additional ball bearing assemblies 51 and 52 transverse to the ball bearing assemblies 42 and 49, as shown in FIGURE 3.

Respective diametrically-opposed pinion gears 53, 53 meshingly-engage the opposing teeth of the bevel gears 40, 47. The gears 53, 53 are formed on shafts 54. The inner end of each shaft 54 is journaled in a ball bearing assembly 51 or 52 and the outer end of each pinion gear shaft 54 is keyed to a gear 55 having a sleeve portion 56 rotatably-supported in a ball bearing assembly 57 mounted in a socket defined by opposing recesses 58, 59 provided in the mating housing segments 14 and 13, as shown in FIGURE 3. Thus, the gears 55, extending in planes perpendicular to the pinion gear shafts 53, are gearingly-connected to the power input shaft 18 by the meshing engagement of pinion gear 53 with bevel gear 40. Also, the pinion gears 53 are gearingly-connected to the output shaft 32 by the meshing engagement of pinion gears 53 with bevel gear 47.

The respective pinion gear shafts 54, 54 are formed with outwardly-facing annular seats 60, 60, and rotatably-engaged on said seats are respective inwardly-concave, generally hemispherical massive flywheel elements 61 and 62.

As will be readily apparent from FIGURE 3, the flywheel elements 61 and 62 are not completely hemispherical, since their skirt portions must be abbreviated sufficiently to provide clearance for the input shaft 18 and output shaft 32, as well as to allow the flywheel elements 61 and 62 to angle somewhat from their normal positions shown in FIGURE 3 in a manner presently to be described. Thus, the central apertures of the flywheels are large enough to permit a substantial degree of angling of the flywheel elements relative to the seats 60, 60. The respective flywheel elements 61 and 62 are formed with recesses receiving the gears 55, said recesses being generally circular and being formed at their peripheral portions with inwardly-directed gear teeth 64 meshing with the peripheral gear teeth of the gears 55, 55 whereby the flywheel elements 61 and 62 are gearingly-coupled to the respective gears 55. Thus, the gears 55 are received in the central recesses 65 of the flywheel elements 61 and 62 with sufficient clearance being provided to allow a substantial degree of angling of the flywheel elements relative to the gears 55 while maintaining meshing engagement of gears 55 with the inwardly-facing gear teeth 64 of the recesses 65. Respective frusto-conical spring washers 66, 66 are provided in the recesses 65 between gears 55 and the inner walls of the recesses, the frusto-conical spring washers 66 converging outwardly and acting to bias the respective annular flywheel elements 61 and 62 to positions wherein their axes coincide with the common axis of the pinion gear shafts 53, 53. The spring washers 66 are sufficiently flexible to, at times, allow the flywheel elements 61 and 62 to angle from the positions thereof of FIGURE 3 to the positions thereof, for example, in FIGURE 2, such as in the case of a sudden change in loading, but the springs 66 exert a biasing force tending to restore the flywheel elements 61 and 62 to the positions thereof shown in FIGURE 3.

Figure 2:
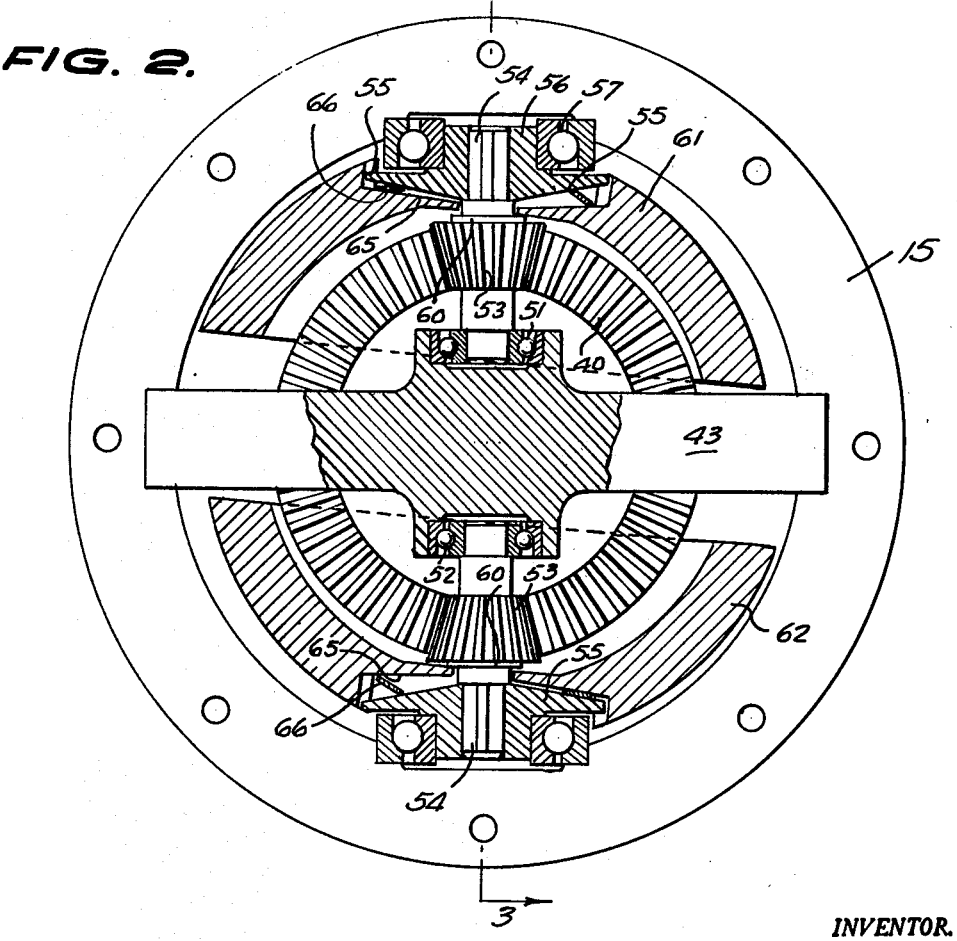
FIGURE 2 is an enlarged transverse vertical cross-sectional view taken substantially on the line 2—2 of FIGURE 1.

It will be seen that the inner faces of gears 55 are generally frusto-conical, being inwardly-convergent, whereby to permit angling of the flywheel elements 61, 62, with the intervening portions of the resilient washer 66 flexing toward parallelism with and between the closest surface portions of the gears 55 and recesses 65. For example, FIGURE 2 shows the flywheel elements 61 and 62 tilted in a clockwise direction from their normal positions of FIGURE 3, with the lefthand portion of the upper ring element 66 flexing in a clockwise direction, since it is being compressed between the left portions of gear 55 and recess 65, whereas the righthand portion of the lower flexible washer 66 is flexed in a clockwise direction by its engagement between the righthand portion of the lower gear 55 and the inside wall of its associated recess 65.

In operation, assuming shaft 32 to be under load, torque is applied to the the input shaft 18 by its prime mover, causing bevel gear 40 to rotate. In view of the load condition of the output shaft 32, this causes the pinion gears 53 to rotate and to begin traveling in planetary fashion around bevel gear 47, thus causing housing 12 to rotate relative to output shaft 32. This, likewise, causes flywheel element 61 to rotate, angling or tilting slightly because of its inertia, and because its outer portions must travel further than its inner portions as it begins to rotate. The flywheel element tilt will be in accordance with the velocity of the input shaft 18, and the flywheel element will remain tilted as long as the velocity of input shaft 18 does not change. The spring washer 66 opposes the outward tilting movement of the flywheel element. As the centrifugal force developed by the flywheel increases, the more will the spring washer 66 be compressed, causing more work to be done in the spring washer, which is converted into resistance to rotation of the flywheel element, and this is ultimately received by output shaft 32 as torque via bevel gear 47. A similar action takes place with respect to the flywheel element 62.

More specifically, by rotating the input shaft 18, bevel gear 40 (which is engaged with the upper pinion gear 53 in FIGURE 3) rotates said upper pinion gear. Said upper pinion gear 53 as well as the lower pinion gear 53 in FIGURE 3 is, likewise, engaged with the bevel gear 47 on output shaft 32. Shaft 32 is, at this time, stationary, so that the pinion gears 53 roll along bevel gear 47. The flywheel 61 rotates with the upper pinion gear 53. At the same time, housing 12 rotates on bearings 20, 33.

Rotation of flywheel 61 around the axis of bearings 20, 33 develops centrifugal force. Flywheel 61 is biased toward its normal orientation by its spring washer 66, but is allowed to oscillate.

Because of the meshing engagement of the teeth of gear 55 with teeth 64, the flywheel 61 must necessarily follow the rotation of the upper pinion gear 53 in FIGURE 3.

Up to this point, rotation of the input shaft 18 has been relatively slow, and no great torque has been developed by the mechanism, the unit being in a "semi-idling" state. With increasing speed of rotation of input shaft 18, greater centrifugal force is developed by flywheel 61 through the rotation of housing 12 around bearings 20, 33, causing an action which tilts flywheel 61 further, flexing its spring washer 66 until stable conditions have been obtained. (Similar effects occur with respect to the spring washer 66 associated with flywheel 62.) The region of flexure on each spring washer changes continuously during transitional periods, although the location of the flexing points relative to housing 12 does not change.

The opposing precessional torque developed by the lower flywheel 62 in FIGURE 3 retards the rotation of lower pinion gear 53 relative to driven bevel gear 47, causing torque to be transmitted from bevel gear 40 to bevel gear 47, and hence, to the loaded driven shaft 32. Thus, the opposing precessional torque tends to cause the pinion gears 53 to rotate only when there is a difference between the driving torque provided by shaft 18 and that required to carry the load on the driven shaft 32.

It is to be noted that alternate arrangements providing a flexible connection of the flywheel means may be employed. It is not absolutely necessary to use spring washers 66. The objective is to provide flexibility in the connections of the flywheel elements in order to make use of the gyroscopic forces at low speeds. For instance, a rather thin flexible steel disc secured to the flywheel shaft can achieve the same effect. In this case, the rim of the disc bends outwardly in the region where the higher peripheral speed is developed while the opposite side of the disc bends inwardly, or toward the drive shaft.

Under normal steady-state conditions, both flywheels 61 and 62 rotate bodily around the main axis of the mechanism. When there is an increase in loading on the output shaft 32, the output shaft slows down, thereby causing the bevel gear 47 to rotate relative to the bevel gear 40 and also causing the pinion gears 53, 53 to rotate between them. The flywheel members 61 and 62 are thus rotated in opposite directions at speeds depending upon the difference in rotational speed between bevel gear 47 and bevel gear 40. This develops a net precessional torque acting on bevel gear 47 which is applied to the load, so that there is a speed reduction without change in speed of rotation of the input shaft 18, namely, without requiring any change in torque applied to shaft 18.

The sensitivity of response depends upon the stiffness of the frusto-conical flexible cushioning washers 66. As previously-mentioned, due to the flexibility of these washers, the flywheel elements 61 and 62 are allowed to tilt responsive to a change from steady-state conditions, allowing the required transmission of torque to be accomplished without excessive shock or vibration. As long as the flywheel elements are rotating square to their own axes and are orbiting around bevel gear 47, there will be no resistance to rotation of the flywheel elements, except for the small resistance produced by the gearing and seals. This is the idling condition of input shaft 18.

In view of the above it is to be noted that the flexibility of the flywheel element mounting is of prime importance in order to achieve the desired reaction of the mechanism and its ability to perform over a wide range of variations of drive conditions. Where the transmission is employed for low speed drive, relatively soft spring washers are employed, so as to yield to centrifugal force at an early stage whereby to transmit torque at a low rotational speed. If stiff spring washers are employed the stiff washers will hold the flywheel elements longer in their square positions relative to their shafts, so that torque is not developed early and the drive shaft runs idle until the centrifugal force is able to tilt the flywheel elements out of their square positions, causing torque to be transmitted. The torque can be increased or lowered with the speed of the input shaft.

While bore 22 serves as a passage for the supply of lubricant to the interior of housing 12, its main function is to provide a pressure relief passage for ventilation or pressure relief in case of excessive pressure build-up in the interior of housing 12.

It will be apparent from FIGURE 3 that due to the symmetry of the mechanism, the shafts 18 and 32 are interchangeable in function. Thus, at times, the shaft 32 may be employed as the power input shaft, and the shaft 18 may assume the function of the power output shaft. Such a condition may occur, for example, where downshifting is required for the purpose of braking the vehicle in which the mechanism is employed. Thus, when the vehicle descends a steep grade, the force of gravity acts to speed up the shaft 32 relative to the power input shaft 18. However, since the power input shaft 18 is connected to the vehicle engine, it acts as a brake on the mechanism, the braking effect being transmitted to the shaft 32 and thence to the vehicle driving wheels.

While a specific embodiment of an improved variable-speed transmission mechanism has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. A variable-speed transmission mechanism comprising a support, a power input shaft journaled on said support, a power output shaft journaled on said support opposite said input shaft, a housing journaled on and receiving said input and output shafts, respective opposing main gears secured on the inner ends of said input and output shafts, diametrically-aligned pinion gear shafts journaled in said housing between said main gears, respective pinion gears fixedly-secured on said pinion gear shafts and meshingly-engaged between said main gears, respective flywheel members on said pinion gear shafts, transverse abutment means rigidly-secured in said housing and extending between said main gears, said pinion gear shafts being journaled between said transverse abutment means and the opposite wall portions of said housing, and means yieldably connecting said flywheel members to said pinion gear shafts, whereby said flywheel members can temporarily change their orientation relative to the pinion gear shafts responsive to changes in speed and loading of the input and output shafts.

2. The variable-speed transmission mechanism of claim 1, and wherein the input and output shafts are in axial alignment and extend into opposite end portions of said housing.

3. The variable-speed transmission mechanism of claim 2, and wherein said main gears comprise opposing bevel gears.

4. The variable-speed transmission mechanism of claim 3, and wherein said pinion gear shafts are on a common transverse axis perpendicular to the axis of the input and output shafts.

5. The variable-speed transmission mechanism of claim 4, and wherein said means yieldably-connecting said flywheel members to the pinion gear shafts comprise toothed gear members on the pinion gear shafts, concentrically-arranged inwardly-facing gear teeth on the flywheel members meshing with the teeth of said gear members, and spring means biasing the flywheel members inwardly relative to the toothed gear members.

6. The variable-speed transmission mechanism of claim 5, and wherein the flywheel members are formed with generally circular recesses receiving the toothed gear members, said inwardly-facing gear teeth being formed in the peripheral walls of said recesses.

7. The variable-speed transmission mechanism of claim 6, and wherein said spring means comprises respective circular springs located between the toothed gear members and the inner walls of the recesses.

8. The variable-speed transmission mechanism of claim 7, wherein said circular springs comprise substantially frusto-conical spring washers.

9. The variable-speed transmission mechanism of claim 8, and wherein the pinion gear shafts are formed with annular outwardly-facing abutment shoulders externally adjacent the pinion gears, said flywheel members comprising generally hemispherical inwardly-concave bodies having central apertures loosely-receiving said pinion gear shafts and pivotally-engaging on said shoulders adjacent said central apertures, said toothed gear members having inwardly-convergent inner faces engaging said frustoconical spring washers to allow pivoting of the flywheel members on said annular abutment shoulders.

References Cited

UNITED STATES PATENTS

| | | | |
|---|---|---|---|
| 1,317,075 | 9/1919 | Couse | 74—710 X |
| 1,758,252 | 5/1930 | Gardner | 74—751 |
| 2,045,584 | 6/1936 | Cotanch | 74—751 |
| 2,067,562 | 1/1937 | Cotanch | 74—751 |
| 2,234,592 | 3/1941 | Fitzner | 74—711 |
| 3,153,353 | 10/1964 | Voight | 74—751 |

FOREIGN PATENTS 772,107   8/1934   France.

ARTHUR T. McKEON, Primary Examiner

U.S. Cl. X.R.

74—640, 710